United States Patent [19]

West et al.

[11] Patent Number: 5,564,260
[45] Date of Patent: Oct. 15, 1996

[54] DISPERSAL OF CREMATED REMAINS

[76] Inventors: Joan B. West; Clyde E. West, both of 8395 Yew Pine Ct., Crystal River, Fla. 34428

[21] Appl. No.: 522,561

[22] Filed: Sep. 1, 1995

[51] Int. Cl.⁶ .................................................. B65B 31/04
[52] U.S. Cl. .............................. 53/434; 53/512; 53/474; 141/10; 141/114; 141/313
[58] Field of Search .......................... 53/432, 434, 510, 53/512, 474; 141/10, 114, 313, 314

[56] References Cited

U.S. PATENT DOCUMENTS

| | | |
|---|---|---|
| 4,877,203 | 10/1989 | Harden . |
| 4,878,335 | 11/1989 | Hardy ........................................ 53/434 |
| 4,974,393 | 12/1990 | Rich et al. ............................... 53/434 |
| 5,007,232 | 4/1991 | Caudill ..................................... 53/510 |
| 5,088,267 | 2/1992 | Gee . |
| 5,121,595 | 6/1992 | Shore . |
| 5,295,891 | 3/1994 | Schalk . |
| 5,341,548 | 8/1994 | Zerick . |
| 5,393,253 | 2/1995 | Humble et al. . |

FOREIGN PATENT DOCUMENTS

| | | |
|---|---|---|
| 1199580 | 7/1970 | United Kingdom . |
| 2181400 | 4/1987 | United Kingdom . |

*Primary Examiner*—John Sipos
*Assistant Examiner*—John Paradiso
*Attorney, Agent, or Firm*—Richard C. Litman

[57] ABSTRACT

Methods for preparing, transporting and dispersing cremated remains via balloon, and a container providing a clean environment for carrying out this method. Cremated remains are deposited into a balloon, the balloon is filled with gas, transported to a launching site and released. To provide an environment that assures substantially complete and safe transfer of the cremated remains to the balloon as well as to provide a sealed chamber for inflation and transport of the balloon, a special container having interior surfaces of vinyl or other barrier materials is used.

3 Claims, 2 Drawing Sheets

DISPERSAL OF CREMATED REMAINS

BACKGROUND OF THE INVENTION

1. Field of the Invention

The present invention relates to methods and apparatuses for the dispersal of cremated remains. More particularly, the present invention is directed to methods for respectfully preparing, transporting, and releasing balloons having cremated remains contained therein, and apparatuses for effectively carrying out these methods.

2. Description of the Prior Art

Final disposition of the deceased is one of the oldest institutions of nearly every civilization. The philosophical, religious, and/or socio-political implications of death have continuously led to highly structured belief systems centered on ritual and ceremony to properly and respectfully mark the passing of life. One concept which lies at the heart of many of these belief systems is the final journey to a better place. Whether or not literally enacted, as practiced by the Vikings who launched their dead in longboats, this concept provides innate comfort for those whose lives have been touched by the deceased. Another concept commonly expressed is the desire for a final resting place that reflects an appropriate environment which may be dear to the deceased.

Currently, the usual practice of ceremonial burial, which may be preceded by cremation, seems to many to be inappropriate or insufficient for meeting these concepts. For example, cemeteries are both restrictive in their locations, and to some, a depressing and solemn resting place. Accordingly, the practice of cremation followed by scattering of cremated remains is often willed or otherwise desired. To carry out this practice often creates a burden in properly preparing, transporting, and disseminating the remains, which may lead to such desires being unfulfilled. This may be especially true when the deceased is a pet or other domesticated animal, for which proper and respectful final disposition is not normally provided for.

Various methods and apparatuses for the transport and/or dissemination of cremated remains have been the subject of earlier patents. For example, U.S. Pat. No. 44,877,203, issued Oct. 31, 1989 to B. Harden describes airborne scattering of cremated remains. This patent also describes placing ashes in a sealed fabric container that may be opened at the desired location/altitude. To use this device, a moving aircraft must be used. U.S. Pat. No. 5,393,253, issued Feb. 28, 1995 to D. Humble et al. describes a wind driven transport device for cremated remains. This seaborne vessel does not provide for dissemination, but includes identification for return of the remains for subsequent interment. A burial/cremation case that may be used to transport a dead animal is described in U.S. Pat. No. 5,341,548, issued Aug. 30, 1994 to J. Zerick.

Devices and methods for filling balloons have also been the subject of earlier patents. For example, U.S. Pat. No. 5,088,267, issued Feb. 18, 1992 to A. Gee describes an apparatus for filling balloons, where various items are placed in an interior cavity. Another device for inflating balloons is described in U.S. Pat. No. 5,121,595, issued Jun. 16, 1992. U.S. Pat. No. 5,295,891, issued Mar. 22, 1994 to A. Schalk describes a holding device for balloons which may include illumination means.

Devices for filling bags or the like with granular material are described in UK Patent Specification 1,199,580, published Jul. 22, 1970, assigned to Fr. Hessr Maschinenfabrik Aktiengesellschaft; and UK Patent Application GB 2,181, 400 A, published Apr. 23, 1987, assigned to Corrugated Products Limited. None of the above inventions and patents, taken either singly or in combination, is seen to describe the instant invention as claimed.

SUMMARY OF THE INVENTION

The present invention provides a method for preparing, transporting and dispersing cremated remains via balloon, and an apparatus specifically suited for carrying out this method. The method includes the steps of: depositing the cremated remains into a balloon having dimensions preselected to contain sufficient quantity of gas to lift the quantity of remains to at least a preselected altitude and bursting substantially at that altitude from the decreased exterior air pressure; filling the balloon with at least the aforementioned quantity of gas; sealing the remains within the balloon; transporting the balloon to a preselected launch site; and releasing the balloon into the air.

To provide an environment that assures substantially complete and safe transfer of the cremated remains to the balloon as well as to provide a sealed chamber for inflation and transport of the balloon, a special container is used. This container has interior surfaces made of or lined with barrier materials. The container includes an opening sized to allow an inflated balloon to be removed therefrom, which is sealed by one or more doors, also made or lined with barrier materials. The container further includes an influent gas tube with an outlet. Ports are provided in the container that allow an operator to insert their arms within the sealed container to manipulate the balloon during filling and/or tying operations. To maintain the seal around these ports, sleeves may be used to accommodate the users arms and hands.

Should rupture or spillage occur, substantially all of the cremated remains within the container, and may be recovered. Pressure release valves may be provided to equalize pressure within the container, so long as they are provided with a device to capture cremated remains in the event of rupture. Control of the influent gas supply may be provided as an integral part of the container.

Accordingly, it is a principal object of the invention to provide a method for dispersing cremated remains in a satisfying respectful manner.

It is another object of the invention to provide an apparatus which allows such a method to be carried out safely and efficiently.

It is a further object of the invention to provide a method which is environmentally compatible.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present methods and apparatuses are carried out using biodegradable, environmentally safe balloons. These balloons are made from materials selected from natural latex rubbers, which have been shown to decompose at a rate at least as high as displayed by tree leaves, and which are substantially nontoxic to wildlife. To achieve this biodegradability, it is important that the balloons burst into small fragments, at a height at which brittle fracture of the latex occurs.

For example, latex balloons filled to about 500% elongation, rise to about 28,000 ft where the volume of the balloon increases to the point where the elastic limit of latex rubber is reached. Typical elongation at this elastic limit, or break point, may vary with the specific latex materials chosen, and the thickness of the balloon material, but these may be assessed by measuring the diameter of the balloon in its deflated state and at the point of rupture.

Typically, elongation at rupture have been reported which vary from about 600 to about 800 percent. The internal pressure and external pressure in a filled state and at rupture may also be measured to approximate the height at which such rupture would occur on release, since external air pressure is inversely proportional to altitude. Once determined, these parameters need not be recalculated for each balloon release for a given balloon. The physics of balloons and balloon releases are known in the art and have been disclosed in, for example, Burchette's paper "A Study of the Effect of Balloon Releases on the Environment," portions of which have been incorporated in the present disclosure.

The size of balloons suitable for the present method will vary with the mass of cremated remains to be dispersed, and the gas chosen, but is preferably from about 0.5 meters for the cremated remains of small pets like birds, to about 2 meters in diameter for large animals and/or humans, when helium is used. Of course, larger balloons than necessary to lift the cremated remains to a rupture height may be used. Accordingly, balloons of from about 1 to 2 meters in diameter are most preferred.

Figure 1:
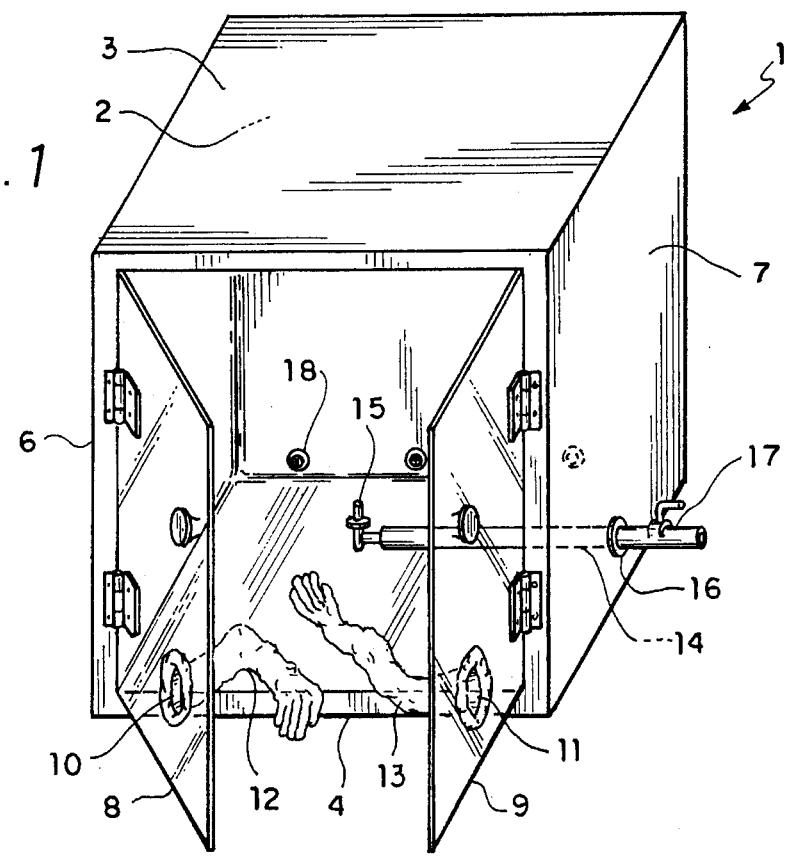
FIG. 1 is a perspective front view of an apparatus according to the present invention.

To practice the present method, the appropriate balloon in its deflated state and cremated remains are placed within a container which may be best seen in FIG. 1. This substantially cubical container 1 has five square walls defining the back 2, top 3, bottom 4, and sides 6 and 7. The side length of the container is chosen to be at least as large as the diameter of the biggest balloons for which the container is to be used. Accordingly, a plurality of container sizes may be provided, depending on the amount of cremated remains contemplated. These walls may be unitarily constructed or joined together. The interior surface defined by these walls are made of, or lined with, a barrier material, preferably a polymeric material such as vinyl or plexiglass. The one open side may be sealed through doors 8 and 9, which are also made of a barrier material. The doors are sized to snugly close the opening to provide an interior clean space protected from the outside environment. Preferably at least one of the walls or the doors is transparent. As seen in the figures, the doors are preferably transparent, and may be made of any clear barrier material, such as plexiglass. Ports 10 and 11 are provided into the interior space defined by the doors and the walls, each sized to accommodate an arm there through. Preferably, these ports are provided in one or more walls or doors which are transparent, so that manipulations may be clearly observed. Most preferably, the ports are provided one each in transparent doors, as shown, and positioned in the lower half of each door. A sleeve 12 or 13, having an open end and a closed end is attached to the periphery of each port such that each sleeve substantially seals the respective port.

Figure 2:
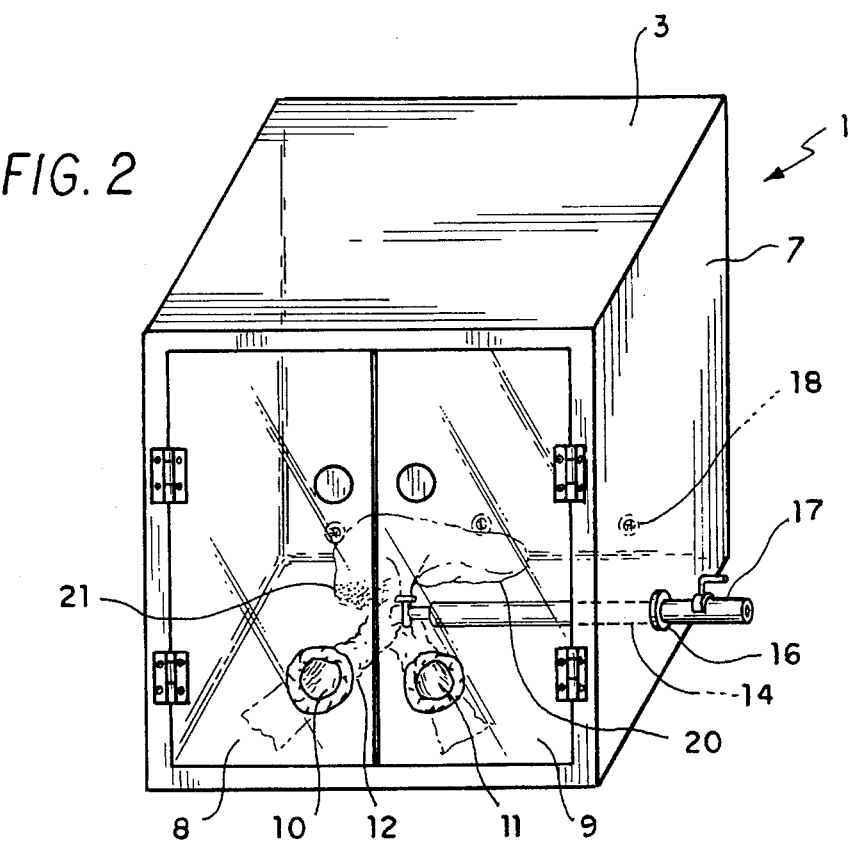
FIG. 2 is a perspective front view of the same, in operation.
Figure 3:
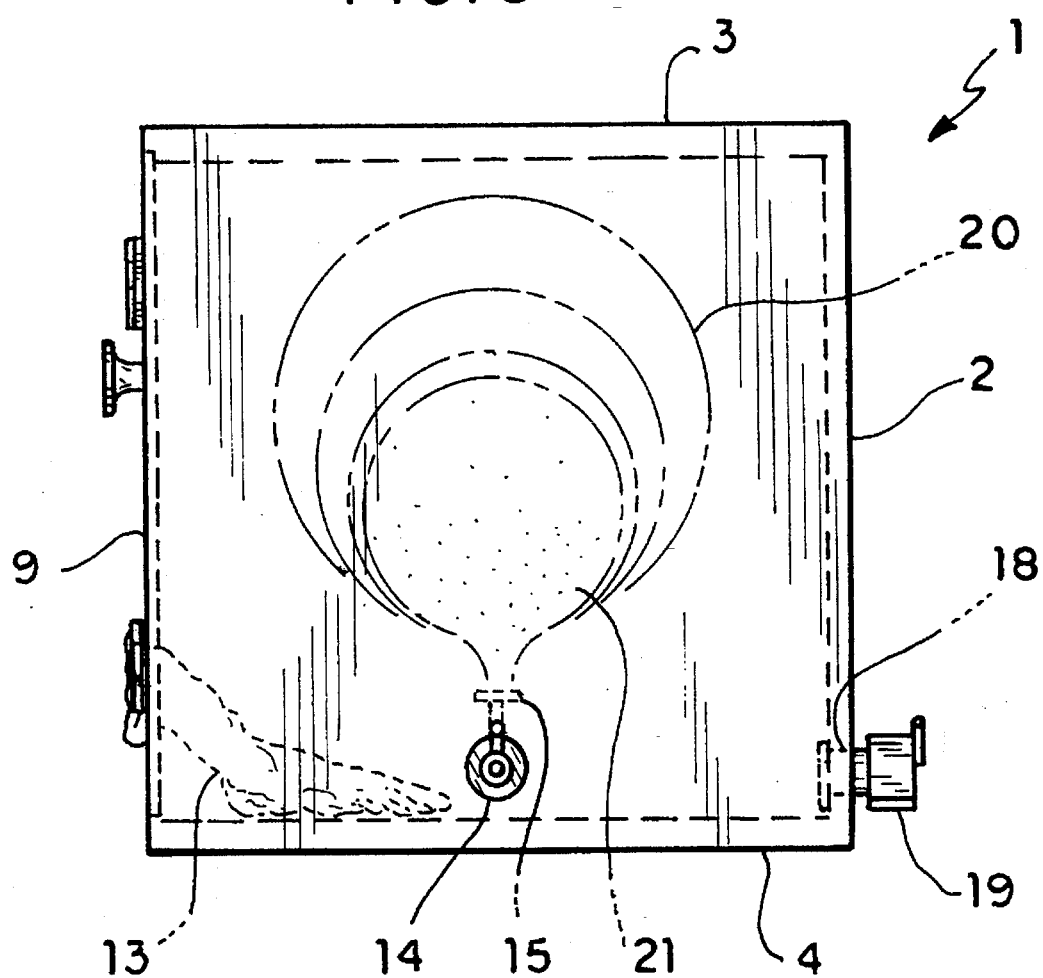
FIG. 3 is a side view of the same.

The container further includes an influent gas tube 14 with an outlet 15. An O-ring seal 16 may be used to insure clean conditions of the interior space. Gas flow is controlled through a inlet valve 17. One or more pressure release valves 18, may be positioned through one or more of the walls, to equalize pressure within the container. As best seen in FIG. 2, these valves have a trap 19 for capturing any cremated remains which would otherwise escape.

In operation, the cremated remains may be weighed to determine the necessary gas volume to lift the remains to a predetermined altitude. The gas selected must of course be lighter than air, and is preferably hydrogen, or helium; most preferably helium. A balloon 20 is selected that will contain this volume, as well as just enough additional volume to accommodate expansion due to reduced external air pressure up to a preselected altitude. The balloon and remains are placed within the container, and the container is closed and sealed. An operator then inserts his or her arms through the ports, into sleeves 12 and 13 attached thereto. The operator then places the cremated remains 21 into the balloon, places the balloon on the outlet 15 of the influent gas tube, and fills the balloon, as shown in FIG. 2. By activating and controlling the inlet valve 17 the rate of filling may be controlled. Proper inflation may be easily determined when the balloon is seen to float inside the container. The balloon is then tied shut, which may be accomplished by knotting the open end of the balloon upon itself, or using a biodegradable string, strap, or like.

The container with the filled balloon inside is then transported to a launch site, where the balloon is released. Should rupture or leaks occur at any point of the process prior to release, the remains are easily collected from within the container and placed in a new balloon, by repeating the present method. To assure that the process may be repeated spare balloons may be provided within the container, and a portable, gas source, such as a pressurized helium tank may be transported with the container.

The balloon once launched will travel with the prevailing winds, and rise to the preselected altitude. There, the balloon will rupture, scattering the remains to the winds. If desired, or if the mass of cremated remains requires a greater lifting volume than can be provided by a single available balloon, the remains may be divided and placed in a multiplicity of balloons. Preferably, each balloon is prepared in separate containers, and transported therein to the launch site.

It is to be understood that the present invention is not limited to the sole embodiment described above, but encompasses any and all embodiments within the scope of the following claims.

We claim:

1. A method for the dispersal of cremated remains comprising the steps of:

depositing a quantity of cremated remains into a balloon having dimensions preselected to contain sufficient quantity of gas to lift said quantity of remains to an altitude at which said balloon will burst from decreased exterior air pressure;

filling said balloon with at least said quantity of gas;

sealing said remains within said balloon;

transporting said balloon to a preselected launch site; and releasing said balloon.

2. The method according to claim 1, wherein said depositing, filling, sealing, and transporting is performed in a sealed container.

3. The method according to claim 2, wherein said container includes: a sealable interior space sized to accommodate said balloon; an opening to said interior space sized to allow passage of said balloon therethrough; at least one door sized to close off said opening to define a sealed interior space; a pair of ports, where each port is sized to allow passage of a human arm into said interior space; a pair of sleeves, each sleeve attached to one of said ports to seal said port, and sized to receive said human arm; a gas influent tube passing from outside said container into said interior space; and a gas outlet positioned within said interior space of said container at one end of said gas influent tube.

* * * * *